United States Patent [19]
Mifsud et al.

[11] 4,133,409
[45] Jan. 9, 1979

[54] VIBRATOR HOLD-DOWN PLATE

[75] Inventors: Joseph F. Mifsud, Houston; John W. Bedenbender, Plano, both of Tex.

[73] Assignee: Exxon Production Research Company, Houston, Tex.

[21] Appl. No.: 717,067

[22] Filed: Aug. 24, 1976

[51] Int. Cl.² .............................................. G01V 1/04
[52] U.S. Cl. .................................................. 181/114
[58] Field of Search ............... 181/113, 114, 119, 121, 181/401

[56] References Cited
U.S. PATENT DOCUMENTS

| | | | |
|---|---|---|---|
| 3,306,391 | 2/1967 | Bays | 181/114 |
| 3,405,780 | 10/1968 | Coburn et al. | 181/114 |
| 3,690,402 | 9/1972 | Stafford | 181/114 |
| 3,866,709 | 2/1975 | Mifsud | 181/114 |
| 3,929,206 | 12/1975 | Bedenbender et al. | 181/113 |

Primary Examiner—Maynard R. Wilbur
Assistant Examiner—Lawrence Goodwin
Attorney, Agent, or Firm—E. Eugene Thigpen

[57] ABSTRACT

A vibratory seismic energy source capable of generating significant energy over a broad frequency band. The vibrating baseplate and associated structure are designed for minimum size and weight, while retaining the structural strength to permit high actuator forces. The weight of the transport vehicle is applied to a substantially horizontal hold-down plate that is interposed between the piston-cylinder assembly and the baseplate. This horizontal plate is coupled to the baseplate through resilient means having compliance such that dynamic motion of the baseplate is decoupled from the hold-down plate and transport vehicle.

6 Claims, 10 Drawing Figures

VIBRATOR HOLD-DOWN PLATE

This invention relates to improvements in seismic energy sources, and in particular, to a broad band vibratory seismic energy source.

In the practice of exploration seismology for the location of subsurface petroleum accumulations, it is necessary to provide a source of energy for inducing propagating elastic waves in the area of the earth to be explored. These elastic waves propagate down into the upper crustal material of the earth, are reflected from impedance discontinuities located therein, and are subsequently detected by geophones or seismometers located at the surface of the earth. The records produced by the geophones or seismometers contain much valuable information about the crustal structure of the earth and may be used to ascertain the existence of petroleum accumulations. It has become common in many cases to use, as the source of propagating elastic waves, a hydraulically operated vibratory source more simply referred to as a vibrator.

In a typical embodiment, a vibrator comprises a double ended piston rigidly affixed to a coaxial piston rod. The piston is located in reciprocating relationship in a cylinder formed within a heavy reaction mass. Means are included for alternately introducing hydraulic fluid under high pressure to opposite ends of the cylinder, thereby imparting a reciprocating motion to the piston relative to the reaction mass. The piston rod extending from the reaction mass is rigidly coupled to a baseplate which is maintained in intimate contact with the earth material. Since the inertia of the reaction mass tends to resist displacement of the reaction mass relative to the earth, the motion of the piston is coupled through the piston rod and baseplate to impart vibratory seismic energy in the earth.

Typically, the vibrators are transported by truck, and it is also known to prevent decoupling of the baseplate from the ground by applying a portion of the truck's weight to the baseplate during operation. The weight of the truck is frequently applied to the baseplate through one or more spring members, each having a large compliance, with the result that a static bias force is imposed on the baseplate, while the dynamic forces of the baseplate are decoupled from the truck itself.

Conventional vibrators are capable of effective operation over a relatively small range of low frequencies, typically 5 to 70 hertz. In the past, these relatively low frequency vibrators have proven to be useful seismic energy sources. As existing oil reserves become depleted, however, it becomes necessary to search deeper and with increased resolution to locate additional reserves. A broad band vibrator (BBV) capable of operation over a band of frequencies wider than those previously achievable with known vibrators is useful in providing greater resolution and meaningful interpretation at greater depth. In order to operate the vibrator so as to provide significant output force levels at high frequencies, it is necessary to minimize the weight of the baseplate and of other structural elements rigidly affixed to the baseplate. In this way, the inertial force which must be overcome solely to move the baseplate weight is minimized. Further, it is necessary to provide sufficient force acting on the piston to overcome the inertial force of the baseplate structure and still induce significant energy in the earth.

Accordingly, it is an object of the invention to provide a BBV capable of inducing seismic energy over a band of frequencies greater than that achievable with existing vibrators.

It is a further object of the invention to provide a BBV having a light-weight baseplate structure.

It is another object of the invention to provide a BBV having sufficient actuator power to overcome the inertial forces of the baseplate structure and yet impart useable seismic energy to the earth at high frequencies.

Briefly, these and other objects are achieved by a BBV having the following characteristics. The ground contacting surface of the baseplate in the preferred embodiment has an area substantially less than that of conventional vibrators in the 20,000 to 30,000 pound force range and has a square shape in contrast with the typical rectangular shape of other vibrators. The baseplate area of the BBV is less than that of existing vibrators, even though the peak actuator force of the latter may be less than half that of the BBV.

The piston rod of the BBV is coaxial with the major axis of the piston, and extends from both sides thereof. The lower segment of the piston rod is rigidly coupled to the center of the baseplate, while the upper segment of the piston rod is coupled through a structure consisting of four stilts to the four corners of the baseplate. Thus, the baseplate is supported both at its center and at each of its four corners. This type of support, coupled with the unique two dimensional I-beam structure of the aluminum baseplate, provides a very light baseplate structure capable of withstanding the high force levels generated by the actuator of the BBV.

Most known vibrators are carried by a vehicle having a source of motor power located near the front end of the vehicle and a drive line extending therefrom to the rear end of the vehicle so as to engage a differential assembly and ultimately to power the rear wheels of the vehicle. Typically, the drive line extends through a portion of the vibrator itself, and it is necessary to configure the vibrator such that there is sufficient clearance for the drive line, whether the vibrator be in its raised or lowered position. In the case of the BBV, the drive line is eliminated and in the absence of a need to provide clearance for a drive line, the vibrator dimensions, particularly its vertical extent, can be substantially reduced. With the reduced dimensions, the stresses imposed on certain structural members, particularly the stilt legs, are less severe and it becomes possible to make these members lighter.

In view of the reduced dimensions of the baseplate, previously known means for imposing the weight of the vehicle on the baseplate itself become impractical. Accordingly, in an embodiment of the invention, a unique one piece hold-down plate is provided to couple the weight of the vehicle through air bags to the baseplate of the vibrator. Further in this connection, and again in view of the reduced baseplate dimensions, the use of radius rods as a means for providing lateral stability between the holddown plate and the baseplate becomes difficult. In the embodiment of the invention, a system of linkages sometimes referred to as a Watt's linkage and adapted to the reduced baseplate dimensions, provides excellent lateral stability.

In the BBV, the reaction mass is a multiple piece structure wherein the plurality of subassemblies are bolted together so as to provide a unitary reaction mass. This economical means of fabrication results in a reaction mass which provides the necessary high mass within the confines of the stilt legs themselves. The stilt legs slant inward as they extend upward from the baseplate, so as to provide effective resistance to horizontal stress, as well as to the vertical stresses generated by the vibrator itself.

The actuator piston and piston rod assembly of the BBV is provided with a hollow tapered bore, designed to result in constant stress as a function of length along the rod and to minimize the mass of the piston and rod assembly itself. Further, the piston and piston rod assembly cooperates with the cylinder of the reaction mass so as to provide an internal braking mechanism for limiting piston over-travel.

Other objects and features of the invention will become obvious from a consideration of the following detailed description when taken in connection with the accompanying drawings wherein.

Figure 2:
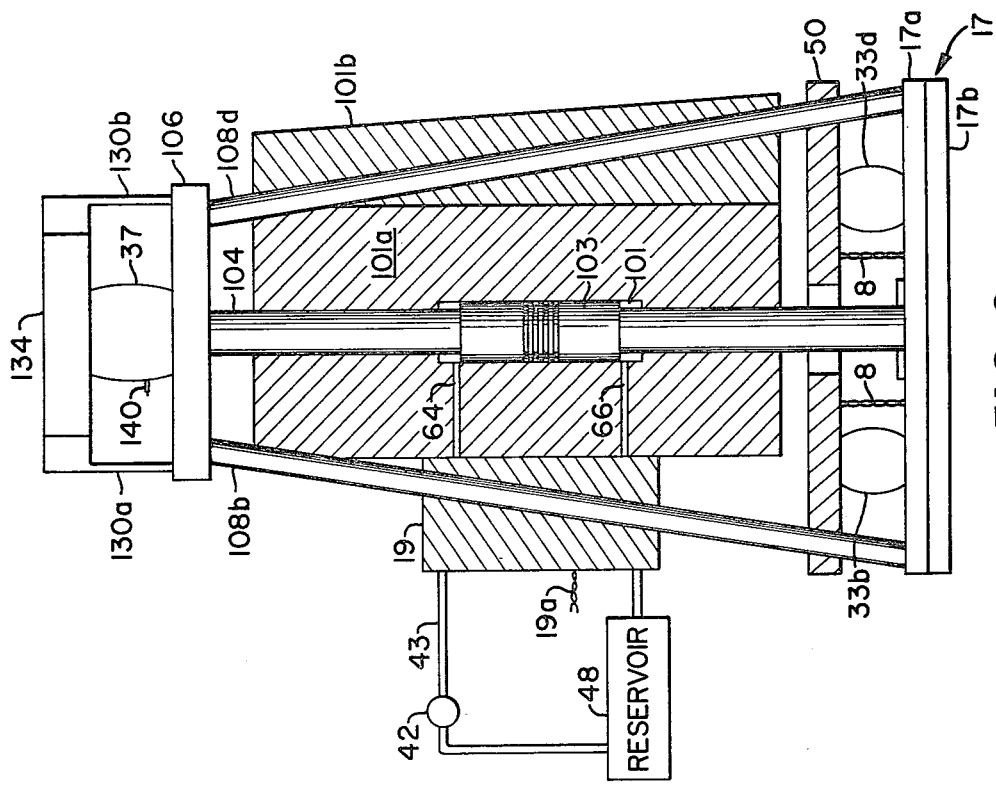
FIG. 2 is a cross sectional schematic view of portions of the vibrator.
Figure 1:
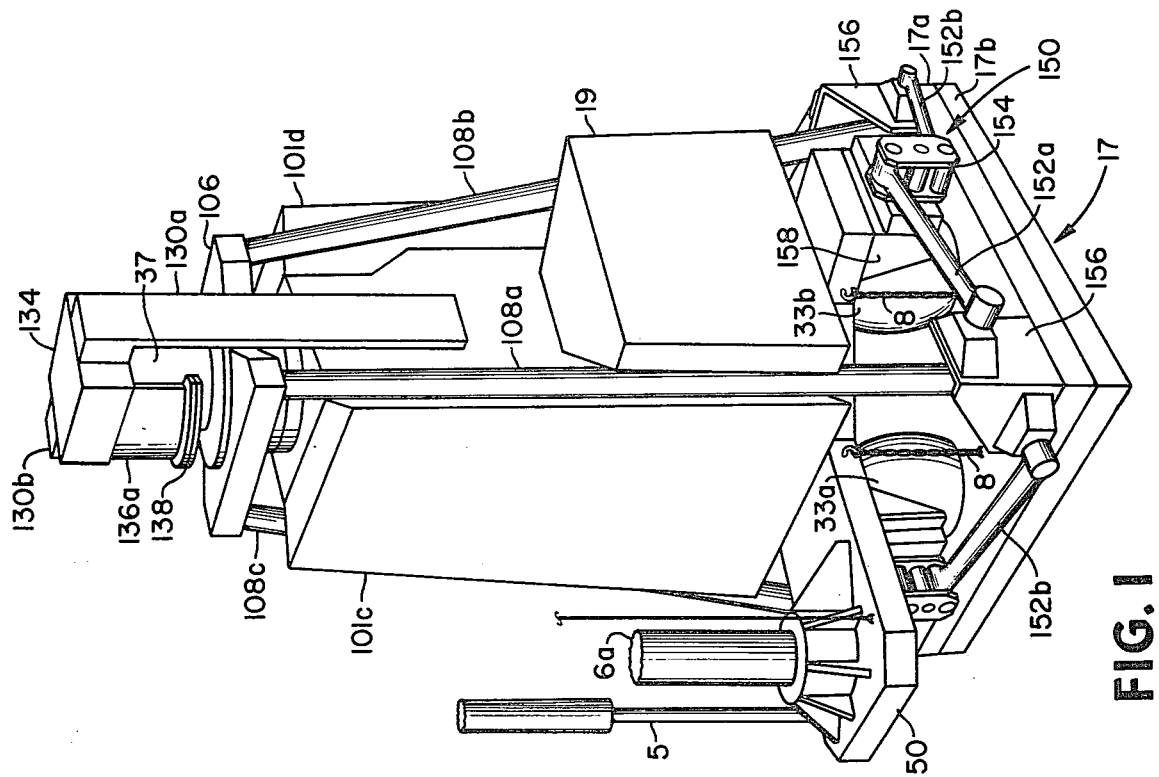
FIG. 1 is a perspective view of a BBV.

FIG. 1 is a perspective view of a vibrator, portions of which are shown in cross section in FIG. 2. Referring to FIGS. 1 and 2, a baseplate 17 is driven by a hydraulic drive mechanism comprising a driving piston 103 reciprocably mounted within a cylindrical bore 101, and a piston rod 104 carrying piston 103 and extending from both the top and bottom of the cylinder housing 101a. The lower end of piston rod 104 is rigidly affixed to the center of the baseplate and the top is rigidly affixed to the center of frame member 106. Stilt legs 108a, 108b, 108c, and 108d (the latter not visible in FIG. 1) extend in slanting relationship from the baseplate to join the corners of frame member 106 to the corners of the baseplate.

It is an object in constructing the BBV to reduce the mass moving with the ground while the vibrator is generating a seismic wave. This "baseplate weight" consists of the actual baseplate which couples the actuator force to the ground and all components, structures, and members rigidly attached to the baseplate. A minimum baseplate weight is of paramount importance in high frequency operation. With a fixed peak actuator force available, the only force which may be coupled into the ground is the actuator force minus the force used to move the baseplate weight. The less force required to move the baseplate, the more there is available to be imparted to the ground.

The equation for the force magnitude required to move a mass at a specific frequency, assuming sinusoidal motion, is:

$$F = (W/g)A(2\pi f)^2 \sin(2\pi ft)$$

where:
F = force,
W = "baseplate weight",
A = mass displatement (½ of peak-to-peak),
g = acceleration of gravity,
f = driving frequency, and
t = time.

With a displacement of A, the force required increases with frequency as a function of the frequency squared. This illustrates the need for a minimum baseplate weight W for high frequency operation.

Figure 3:
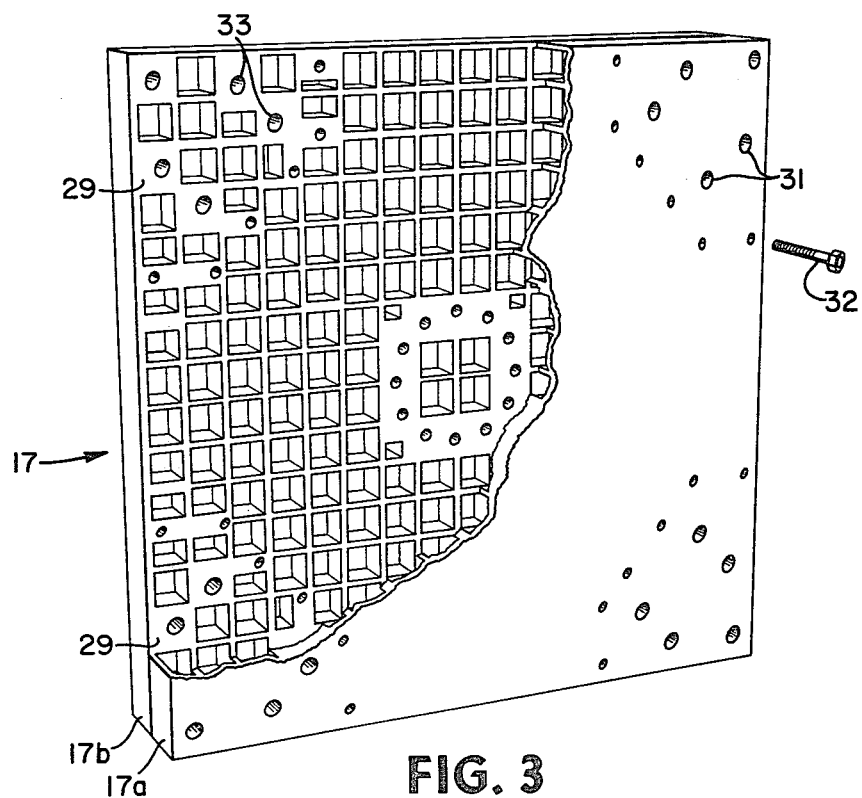
FIG. 3 is a perspective view (partially cut away) of a baseplate.

To achieve the objective of minimum baseplate weight while retaining structural rigidity, the ground coupling plate (baseplate) is constructed from two aluminum sections, 17a and 17b, the internal surfaces of which have a honeycomb appearance. One surface of each of the plate sections may be milled out as illustrated in FIG. 3. In a preferred embodiment, the baseplate may be square, having dimensions of four feet on each side. Each of the baseplate sections may be approximately 3½ inches thick. As shown in FIG. 3, the internal sides of both sections of the baseplate are milled out in a 16 × 16 grid, of 3 inches each. Individual sections may be milled out to a depth of 2.85 inches, with 0.25 inches left between each milled out section. It should be emphasized that the dimensions can vary, depending on the force and rigidity requirements of a particular vibratory structure.

Certain portions of the baseplate sections, such as those designated by numeral 29, are left unmilled in order to provide locations for bolting the two sections together. In the top portion of the baseplate, holes, such as those designated by numeral 31 are drilled, and bolts, such as bolt 32, are inserted through these holes to secure the two sections of the baseplate together. Corresponding holes, such as those designated by numeral 33, are drilled into the bottom section of the baseplate. Screw threaded receptacle means are inserted in the bottom section of the baseplate to receive the bolts inserted through the holes in the top section. In general, the holes utilized for securing the two sections of the baseplate together are positioned so that the connecting bolts also affix additional vibrator structure to the baseplate.

It is known in the seismic vibrator art to fabricate the generally rectangular baseplate of a plurality of parallel steel I-beams. The longitudinal axes of the I-beams are located parallel to the major axis of the rectangle and adjacent I-beams are oriented so the edges of their upper and lower flanges are abutting (the webs of the I-beams lie in vertical planes). The I-beam flanges are welded together so as to provide a unitary structure which may be further reinforced by top and bottom reinforcing plates. It will be appreciated that this type of structure provides great resistance to stress exerted along the major axis of the rectangle. While the resistance to stress may be expected to be less along the minor axis of the rectangle, the use of steel I-beams resulted in a baseplate with sufficient stress tolerance for the force levels employed in prior art vibrators.

In the case of the BBV, the use of a steel baseplate structure would impose a severe weight penalty on the vibrating mechanism. Alternatively, an aluminum baseplate structure comprised of a plurality of one-dimensional I-beams might not have sufficient stress resistance for the forces generated by the BBV. It will be appreciated that the two-piece aluminum baseplate structure of the present invention, when bolted together as set forth above, comprises a unique two-dimensional I-beam structure. As a result of this unique structure, the baseplate may be maintained within acceptable weight limitations and yet be capable of withstanding the large forces generated by the BBV. In this description and in the accompanying claims the term "two-dimensional I-beam structure" is considered to include structure such as that illustrated in FIG. 3 as well as similar structures such as one having a plurality of I-beams radiating from the baseplate center. Further, in the structure of FIG. 3, it is not necessary that the I-beam webs be coplanar from cell to cell of the structure.

The center of the baseplate is rigidly connected to the lower end of piston rod 104. Piston rod 104 may have an annular flanged portion at the lower end with a plurality of holes therein. The same bolts that function to secure the center portions of the baseplate sections together affix the piston rod to the baseplate.

As stated earlier, the top of piston rod 104 is connected to the center of frame member 106. Connected at each corner of this frame member is an inclined stilt leg which is fixedly connected to a corner of the baseplate. When vibrations are induced by controlled hydraulic fluid flow into and from cylinder 101, motion generated in the piston is transmitted to the center and to each of the four corners of the baseplate. This configuration is a very rigid vibratory structure which produces a uniform movement of the entire baseplate closely corresponding to the motion of the piston.

The stilt legs 108 are subjected to a complex form of loading. The loading consists of vertical and horizontal forces. The vertical loading is due to the simple vibratory operational mode of the piston 103. The piston rod 104 is of adequate strength to withstand the vertical loading.

The horizontal loading is due to ground rocking and ground resonances. Because the rigidity of the stilt legs 108, when loaded horizontally, is many times greater than the rigidity of piston rod 104 as a cantilever, only the stilt legs provide significant resistance to horizontal loading. In doing so, the horizontal loading appears primarily as tension or compression in the stilt legs 108. The stilt legs provide greater strength when loaded in either compression or tension than when subjected to bending forces. The use of inclined stilt legs is superior because of the efficient structural use of its members. The efficiency of the inclined stilt legs permits the stilt leg dimensions to be reduced below those which would be necessary if previously known stilt leg configuration (i.e., vertical legs) were employed. It will be seen, therefore, that the unique stilt leg configuration further contributes to minimization of the baseplate weight. The baseplate weight is reduced even further by the elimination of the lower cross member, commonly used in previous vibrators.

For the purpose of imparting vibratory movement to the piston 103, there is provided a manifold and servo valve member 19. The servo valve follows the electrical control signal fed to it through conducting leads 19a. Hydraulic actuating power for the servo valve is supplied through line 43 from an external hydraulic power source, including pump 42 and reservoir 48 (see FIG. 2). The servo valve controls the flow of hydraulic fluid into and from cylinder 101 through port means 64 and 66 within the walls of cylinder housing 101a above and below piston 103 to generate piston motion corresponding to the electrical input control signal. Hydraulic supply mechanisms are well known in the art and need not be discussed in greater detail here. One such mechanism is disclosed in U.S. Pat. No. 3,929,206.

The hydraulic vibrator generates a force against the ground by pushing against a reaction mass comprising the mass of cylinder housing 101a, plus additional mass affixed to the cylinder housing. This additional mass includes manifold and servo valve member 19, which in the preferred embodiment is mounted on the forward portion of the vibrator. The additional mass further includes rear balance weight 101b and side weights 101c and 101d. Thus, it will be seen that the reaction mass is a "multi-piece bolt together" mass consisting of a center section 101a which houses the actuator, two side weights 101c and 101d, a rear balance weight 101b, and the manifold and servo valve member 19. The mass pieces are shaped so that the stilt legs pass through but do not touch the mass shapes.

The weight of the hydraulic cylinder housing and mass attached thereto is decoupled from the baseplate mass by air spring 37 which is attached to the top of frame member 106. Two vertically extending members, 130a and 130b, connect the top of the reaction mass to a frame member 134 affixed to the top of the air spring 37. Air spring 37 is an isolation spring and also sets the average position of the hydraulic piston 103 in the center of the cylinder to ensure more linear operation of the hydraulic vibrator. Air spring 37 is inflated to a desired pressure through a conventional fill valve shown as valve 40. Two arcuate sections 136a and 136b (the latter not shown) are affixed to the bottom of frame member 134 on opposite sides thereof, and a layer of elastic material 138 is attached to the lower edges thereof. This elastic layer serves as a buffer when the up-stroke of the hydraulic piston is too large. A comparable structure (not shown) functions as a buffer when the down-stroke is too large.

Figure 4:
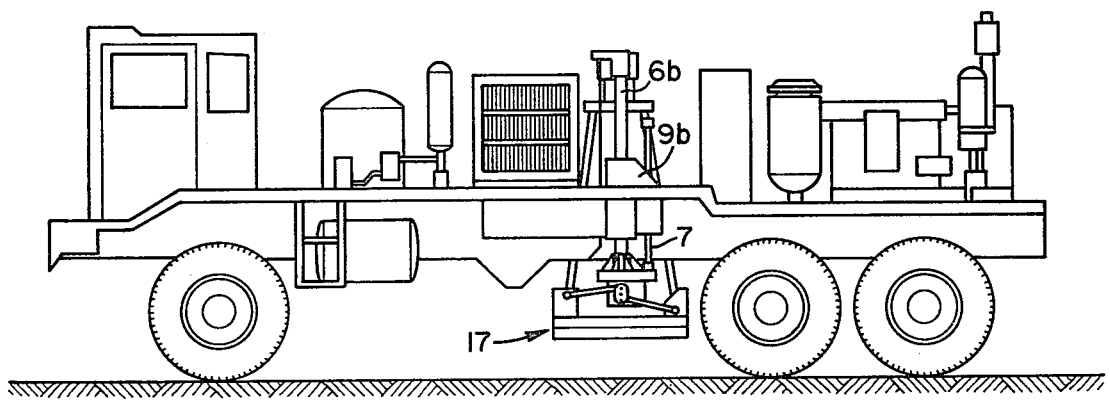
FIG. 4 illustrates the vibrator mounted in a truck.

As is common practice in the art, the body of the vibrator is located between the frame members of the truck. In the usual design of hydraulic vibrators, the baseplate extends outwardly from the vibrator, and vertical guide rods and hydraulic lift cylinders extend from the truck frame to a "footpiece" above outwardly extending portions of the baseplate. The weight of the vibrator transport truck is applied to the baseplate through the "footpiece" and spring isolation means to assist in holding the baseplate on the ground. In the present vibrator, in addition to milling out portions of the baseplate, the dimensions of the baseplate have also been reduced in order to reduce the moving mass. Because of the reduced size, the baseplate does not extend from beneath the vibratory body sufficiently to permit applying the truck weight to the baseplate in the conventional manner. A unique one-piece hold-down plate 50 permits the use of the small baseplate. The weight of the truck is transferred to the hold-down plate hydraulic lift cylinders 5 and 7 (see FIGS. 1 and 4). The hold-down plate extends beneath the reaction mass and rests upon four air bags 33a, 33b, 33c, and 33d (the latter two not shown in FIG. 1), which are affixed between the hold-down plate and the baseplate. The air bags may preferably be spaced at regular intervals around the baseplate to couple the weight of the truck to the baseplate evenly. The vibrator piston rod extends through the center portion of the hold-down plate which has a cut out section for that purpose. In addition to permitting the use of a small baseplate, the hold-down plate also provides a means for distributing the air springs so as to couple the weight of the transport truck to the baseplate in a more uniform manner about the surface of the baseplate. In the preferred embodiment, air bags 33a, 33b, 33c, and 33d are pneumatically isolated. It is possible, however, for the air bags to be pneumatically coupled without departing from the spirit and scope of the invention.

Hydraulic lift cylinders 5 and 7 (see FIGS. 1 and 4) control the vertical position of the vibrator relative to the truck. The cylinder housings of lift cylinders 5 and 7 are affixed to the truck frame and the piston rods thereof are affixed to the hold-down plate. When hydraulic fluid is pumped into the upper portion of the lift cylinders 5 and 7, the pistons are forced down relative to the cylinders and the vibrator is lowered to the ground. After the baseplate is lowered to the earth's surface, if additional hydraulic fluid is pumped into the upper portions of lift cylinders 5 and 7, the truck will be lifted off the ground and its weight will bear on the hold-down plate. The air springs which interconnect the hold-down plate with the baseplate transmit the weight of the truck to the baseplate. The truck is lowered back to the ground and the baseplate lifted off the ground by pumping hydraulic fluid into the lower portions of the lift cylinders 5 and 7. As the baseplate is lifted off the ground, it is suspended from the hold-down plate by means of a plurality of chains 8. Guide rods 6a and 6b (see FIGS. 1 and 4) slide through the cylindrical bores of guide frames 9a and 9b (9a not shown) which are rigidly affixed to opposite sides of the transport truck. These guide rods are normally interconnected so that they move up and down in unison. Techniques for performing this function are well known in the art and need not be discussed here, one such technique being shown in the aforementioned U.S. Pat. No. 3,929,206.

Because air springs 33a, 33b, 33c, and 33d have little resistance to lateral stress, a linkage mechanism is used to maintain the baseplate in vertical alignment with the vibrator and to apply the weight of the truck substantially to the center of the baseplate. This horizontal stabilization is required to not interfere with or detract from, to any appreciable extent, the desired vertical motion of the baseplate. Further, the horizontal stabilization mechanism should impose no appreciable horizontal motions to the truck. It is known in the art to use for this purpose, a multiplicity of radius rods, one end of each radius rod being pivotally attached to the baseplate, and the other end being pivotally attached to a part of the lift mechanism of the truck.

This radius rod type of stabilization system provides good horizontal control between the baseplate and the hold-down plate of the vehicle lift system. The radius rod system, however, does impose undesirable horizontal motion to the hold-down plate as the baseplate moves vertically. The undersirable horizontal motions become more severe as the radius rod length is decreased, as it would have to be if this type of stabilization system were used on the BBV. It is common practice in the design of vibrators to use pairs of radius rods mounted so that they are in opposition. The tendency for horizontal displacement as the vibrator moves vertically is taken up by rubber bushings in the eye ends of the radius rods. Deflection of the rubber bushings, however, takes energy from the vibrating baseplate.

Figure 5:
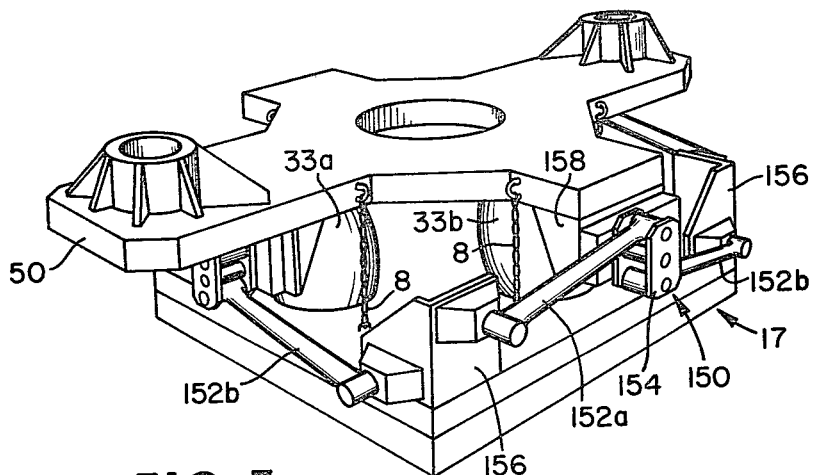
FIG. 5 is a perspective view illustrating stabilizing means for a vibrator.

With reference to FIGS. 1 and 5, a linkage mechanism designated by numeral 150 is used to maintain the baseplate of the BBV in vertical alignment with the truck. The linkage mechanism is comprised of equal length rods 152a and 152b and rotating center link 154. An end of each equal length rod is connected to a mounting assembly 156 rigidly affixed to the corners of the baseplate. The other end of each equal length rod is connected to center link 154. Center link 154 is connected in the center thereof in a rotating manner to plate 158 which extends downwardly from the hold-down plate in substantially vertical alignment with the edge of the hold-down plate. Center link 154 rotates freely about this center connection and the two equal length rods rotate freely about a connection to opposing ends of center link 154. The ends of the equal length rods connected to mounting assembly 156 are also rotationally free. One of these linkage mechanisms 154 is affixed to each side of the vibrator baseplate. This mechanism permits the baseplate to move up and down relative to the hold-down plate while maintaining vertical alignment. When the baseplate moves down in relation to the hold-down plate the center link 154 will rotate in a counterclockwise direction. When the baseplate moves up relative to the hold-down plate, center link 154 rotates in a clockwise direction. In a preferred embodiment, the ends of rods 152a and 152b may be connected by a ball joint to the mounting assembly connected at the corners of the baseplate, to permit an additional degree of freedom. This linkage mechanism permits the baseplate to tilt relative to the hold-down plate. Therefore, if the vibrator is on ground which is not in parallel alignment with the plane of the truck, the baseplate can tilt so as to rest evenly on the ground.

Figure 6A:
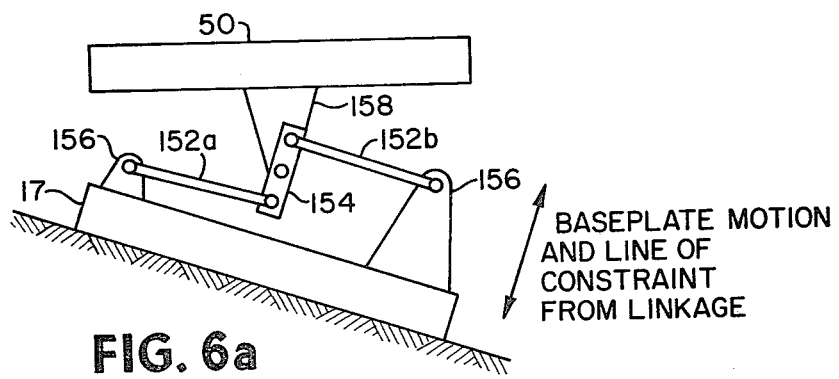
FIGS. 6a and 6b illustrate an alternative configuration for the stabilizing means.
Figure 6B:
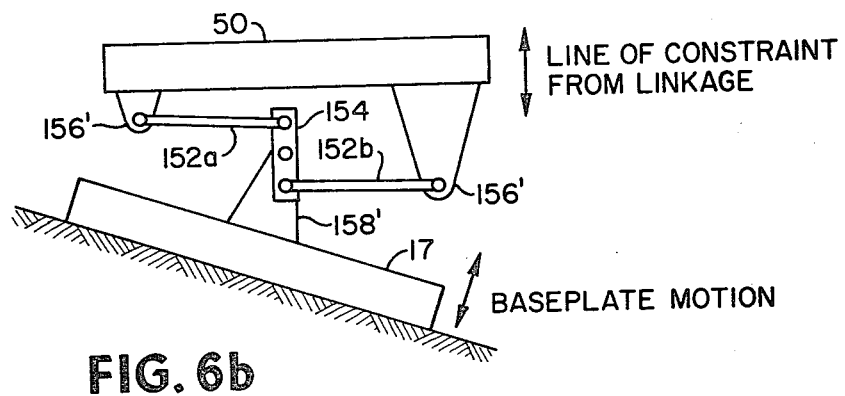

In the preferred embodiment, the center link and its pivot are attached to the hold-down plate, while the extremities of rods 152a and 152b are pivotally attached to supports on the baseplate. Alternatively, the center link and pivot may be attached to the baseplate, while the extremities of the rods can be pivotally attached to supports on the hold-down plate. The arrangement of the preferred embodiment, however, has a distinct advantage when the vibrator is operating on sloping ground. With reference to FIG. 6a, which illustrates the arrangement of the preferred embodiment, the baseplate is driven by the vibrator along a line perpendicular to the baseplate and ground. The baseplate is also guided along this same line by the constraint imposed by the linkage. FIG. 6b illustrates the arrangement of the alternative embodiment wherein the baseplate motion is again along a line perpendicular to the baseplate and the ground, while the linkage tends to constrain the motion to a vertical line. Thus, the stabilizing linkage in this case will impose horizontal forces between the baseplate and the hold-down plate.

In the preferred embodiment, stabilizing rods 152a and 152b have equal length and center link 154 is symmetrically disposed about its pivot point. It is also within the contemplation of the invention to use stabilizing rods of unequal length and a non-symmetrical center link.

In the preferred embodiment, the length of each of stabilizing rods 152a and 152b is 19 inches, while the distance between the points at which the stabilizing rods are coupled to center link 154 is 5.625 inches. As an example of the effectiveness of the stabilizing means, if the baseplate moves vertically with respect to the hold-down plate by a distance of 2 inches, there will be a relative horizontal displacement between the baseplate and hold-down plate of 0.00021 inches. If a radius suspension were used in this case (with a rod length of 38 inches), for a vertical displacement of 2 inches there would result a horizontal displacement of 0.0527 inches. Thus, the stabilizing linkage employed in the BBV reduces the horizontal displacement by a factor of 250.

From the foregoing, it will be seen that the unique stabilizing system provides several important advantages. Vertical translation of the baseplate results in negligible horizontal motion imparted to the supporting truck by the stabilization system. Further, the space required for the stabilization system is reduced. Finally, the energy absorbed by the stabilization system is reduced, thereby increasing the net seismic energy into the ground.

Figure 7A:
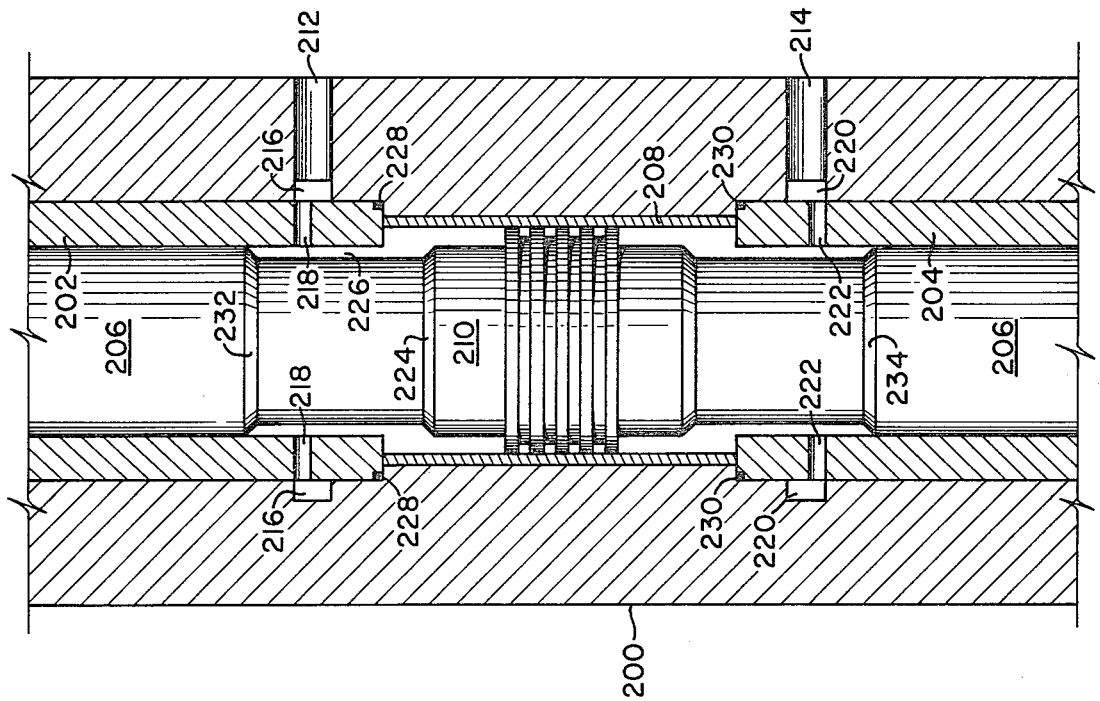
FIGS. 7a and 7b are a partial sectional view of the cylinder of a prior art vibrator and of the BBV.
Figure 7B:
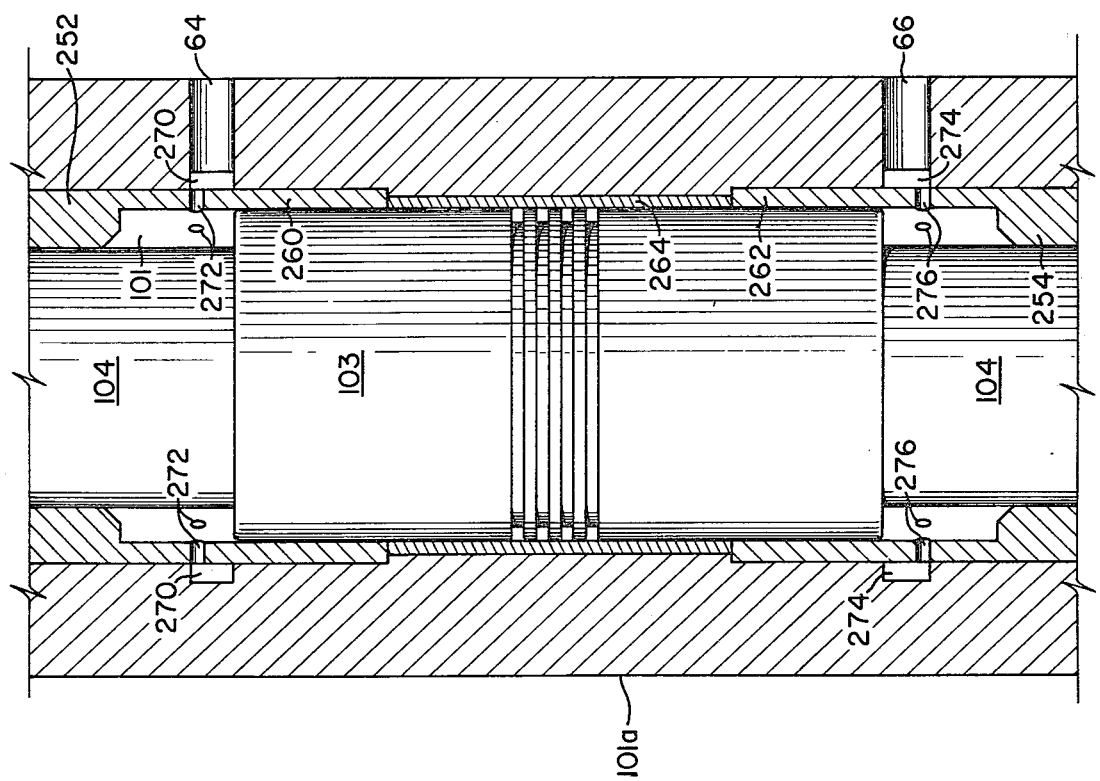

FIG. 7a is a sectional view of the cylinder area of the reaction mass from a prior art vibrator. FIG. 7b is a sectional view of the corresponding portion of an embodiment of the present invention. All vibrators are provided with an over-travel limit system which serves to prevent the piston from traveling beyond its nominal stroke to the point where the piston impacts an end of the cylinder. Most vibrator actuators have springs or externally mounted hydraulic shock absorbers as part of the over-travel limit system. That type of over-travel limit system has several features which render it undesirable for use in the present vibrator. The first problem relates to the effective oil volume in the cylinder of the actuator. A frequency is reached at which the volume of the oil within the cylinder acting as a spring resonates in conjunction with the load mass. This oil column resonance places an upper limit on the range of frequencies over which the vibrator can operate. The frequency of oil column resonance varies inversely with the square root of effective volume of oil within the cylinder. Accordingly, it will be seen that in the BBV it is essential to minimize this effective oil volume.

As the piston moves from the center of the cylinder to the limit of its stroke, it sweeps a volume of oil from the piston equal to the product of the piston area and its length of stroke. If the piston travel, however, exceeds its nominal stroke, it will sweep an additional volume of oil equal to the product of the piston area and the length of over travel. Thus, this additional oil volume, for which no benefit is received, is proportional to the distance that the piston over travels before the over-travel limit system stops it. The amount of over travel with prior art externally mounted limit systems is large and results in an effective cylinder oil volume that is undesirable for the present invention.

Additionally, the use of external shock absorbers reduces the reliability of an over-travel limit system. For example, if the plunger fails to reset due to a broken return spring or if not enough time has elapsed for a normal resetting before the over travel condition repeats, no shock absorber action will occur. In an embodiment of the present invention, there is provided an internal over-travel limit system which is reset if the actuator is in the working stroke. While an internal over-travel limit system is known in the prior art, the internal limit system of the present invention has several features which render it more advantageous for use in a high frequency vibrator.

The essential features of the prior art internal limit system are illustrated in FIG. 7a. There is shown in sectional view a portion of a reaction mass 200 including the cylinder region of the reaction mass. An axial hollowed out portion of circular cross section extends through the reaction mass. This hollowed out portion is lined over part of its length by bronze bushings 202 and 204 which serve to support in sliding relationship, the piston rod 206 of a double ended piston. The cylinder area of reaction mass 200 is lined by a sleeve 208 of a metal such as cast iron. Piston 210, including a plurality of piston rings, is reciprocably located within the confines of the cylinder. Clearance is provided between the walls of the piston and the inner surface of sleeve 208 so that only the piston rings are in contact with sleeve 208. Ports 212 and 214 communicate with the manifold (not shown) so as to admit oil under high pressure alternately to opposite sides of the piston. Port 212 opens into an annular passage 216 which extends around the outer circumference of bushing 202. Passage 216 in turn communicates with a plurality of holes 218 located in and about the circumference of bushing 202. Thus, if will be seen that high pressure oil from the manifold is admitted through port 212, passage 216 and holes 218 into a portion of the cylinder formed by the inner surface of bushing 202 and a narrowed portion of piston rod 206. The oil so admitted may flow into the main body of the cylinder so as to generate a force acting against one side of the piston. In a similar manner, oil from the manifold flows through port 214, channel 220 and holes 222 to the opposite end of the cylinder.

The internal braking action provided by the illustrated structure may be appreciated from the following brief operational discussion. Let it be assumed that oil is admitted under high pressure through port 214 to the right side of the cylinder. This causes the piston 210 and piston rod 206 to move to the left and oil from the left side of the cylinder is exhausted through port 212 to a reservoir of low pressure oil. This continues until shoulder 224 of the piston rod reaches and begins to enter bushing 202. At this point in time, a volume of oil is trapped in region 226 of the cylinder. This trapped volume of oil imparts a braking action to the piston and prevents it from impacting the end of bushing 202. The piston braking is accomplished by the trapped volume which escapes slowly through the small clearance provided between the portion of piston rod 206 which is not narrowed and the inner surface of bushing 202. Because of the high pressure occurring in region 226 during braking action, it is necessary to provide an O-ring 228 for preventing the escape of oil between bushing 202 and reaction mass 200. A corresponding O-ring 230 is provided at the other end of the cylinder. In the structure illustrated, it will be noted that the piston and piston rod are unsupported over the entire region between shoulder 232 and shoulder 234. In the prior art vibrator illustrated, this is a length of approximately 16.5 inches.

The internal hydraulic braking action provided by an embodiment of the present invention may be illustrated with the aid of FIG. 7b which shows a sectional view of a portion of the reaction mass 101a. Reaction mass 101a is provided with an axial bore extending through its entire length.

The bore is lined at its ends by bushings 252 and 254 which provide bearing surfaces for the piston rod 104 of a double ended piston 103. In the preferred embodiment bushings 252 and 254 are made of bronze. Other materials, however, may be used for the bushings. One such suitable material is a polymide manufactured under the trade mark VESPEL by Dupont. Bushings 252 and 254 also serve to support piston 103 in the areas indicated by reference designators 260 and 262. In the region of the piston rings, the surface of the bore is lined by a sleeve 264 of a metal such as cast iron.

Ports 64 and 66 communicate with the manifold (not shown) to serve as input and exhaust ports for oil entering and leaving the cylinder. Port 64 opens into an annular passage 270 which extends around the outer circumference of bushing 252. Passage 270 in turn communicates with a plurality of slots 272 formed in bushing 252 whereby oil is admitted to and exhausted from one side of the cylinder. In a similar manner, port 66 cooperates with annular passage 274 and slots 276 to provide a path for the oil to the opposite end of the cylinder.

During operation of the vibrator, as high pressure oil is admitted through port 66 so as to exert a force against the piston driving it to the left, oil is forced out through port 64 to a low pressure reservoir. During normal operation, prior to the time when piston 103 passes the plurality of ports 272, the flow of oil will be reversed so as to admit high pressure oil to port 64 and allow oil to leave the cylinder through port 66 to the low pressure reservoir. Under abnormal conditions, however, the piston may exceed its designated stroke and travel sufficiently far to the left to close off slots 272, thereby trapping a volume of oil in the end of the cylinder. This trapped oil is bled back to the slots through the radial clearance between piston 103 and bushing 252. The concentricity and radial clearances are selected to obtain a desired shock absorber action. The equation used to predict the shock absorber response is:

$$F_D = \frac{6\mu\pi(r^2 - r_o^2)^2 LL'}{RC^3 (1 + \frac{3}{2} E^2)}$$

where
$F_D$ = Retarding force,
u = Oil viscosity,
L = Length of engagement
L' = Relative velocity between the rod and rod bushing,
ro = Small rod diameter,
R = Rod bushing cavity radius,
r = Piston radius (plunger),
C = R − r = radial clearance,
e = eccentricity, piston relative to cavity, and
E = e/C.

The internal shock absorber illustrated in FIG. 7b is superior to the prior art arrangement of FIG. 7a in several respects. First, piston 103 is always engaged in bushings 252 and 254 at regions 260 and 262 respectively. Accordingly, there is no mechanical "plunger" insertion into the bushing. This enhances the reliability of the mechanism.

Secondly, since mechanical support for the piston is provided by bushings 252 and 254 in regions 260 and 262, respectively, the longest unsupported length of the actuator rod structure is that portion of the piston that is enclosed within liner 264. In the preferred embodiment, this unsupported portion of the piston extends only over a length of 9.2 inches. By reducing the unsupported length of the piston, the stresses exerted on the actuator rod are relatively reduced. As will be discussed below in connection with FIG. 8, this permits the piston rod assembly to be hollow, thereby further reducing the weight of the baseplate and associated elements.

When the over travel condition occurs, in the preferred embodiment the oil is trapped between the piston 103, the piston rod 104, and either of bushings 252 and 254. As a result, it is not necessary to provide O-rings corresponding to O-rings 228 and 230 in FIG. 7a. These O-rings are required in the prior art structure since, there, the braking oil volume is trapped ahead of bushings 202 and 204. Elimination of the O-ring reduces the actuator cost. Further, it will be noted that piston rod 104 does not require the additional machining operations required to produce the reduced diameter section of piston rod 206 in the prior art structure. Finally, in the preferred embodiment, there is no oil volume corresponding to that volume of oil located between the reduced diameter section of piston rod 206 and bushings 202 and 204 in the prior art structure. As mentioned previously, this reduced oil volume is advantageous in high frequency operation of the vibrator.

Figure 8:
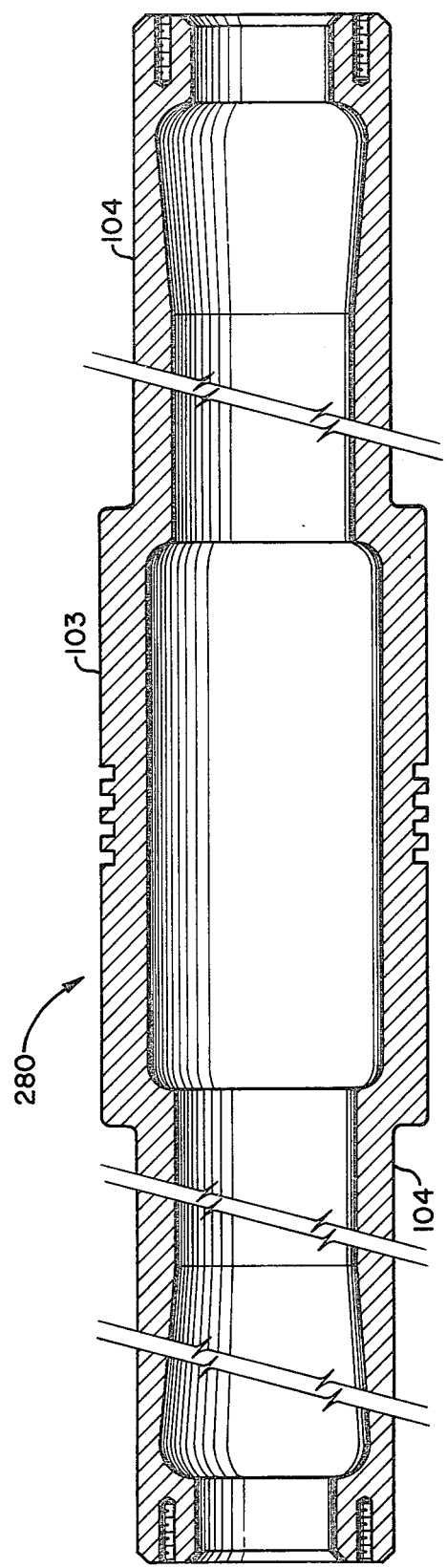
FIG. 8 is a sectional view of a vibrator actuator rod.

FIG. 8 is a sectional view showing the configuration of the actuator rod 280. The rod is hollow so as to reduce the baseplate weight of the vibrator. The tapered bore of the rod is specifically designed such that the stresses resulting from forces applied transverse to actuator rod 280 are approximately constant as a function of distance along the rod. As a result, no portion of the rod is "over-designed" (and correspondingly overweight) relative to another portion of the rod.

The diameter of the sleeve in which the piston 103 runs, in the preferred embodiment, is nine inches, while the diameter of the piston rod is seven inches. As a result the effective piston area at either end of the piston is 25.13 square inches. Hydraulic fluid is supplied to the BBV at a pressure of 3000 psi. Accordingly, it will be seen that the peak force acting on the piston of the BBV is 75,390 pounds, far in excess of that used in other vibrators.

There has been disclosed a new seismic vibrator, suitable for operation over a broad band of frequencies. Whereas the preferred embodiment of the invention has been disclosed, there may be suggested to those skilled in the art certain minor modifications which do not depart from the spirit and scope of the invention as set forth in the appended claims.

What is claimed is:

1. A vibratory seismic energy source transported by a vehicle comprising:
    (a) a reaction mass having a hydraulic cylinder formed therein;
    (b) a piston reciprocably located within said hydraulic cylinder and a piston rod extending from the lower face of said piston through the lower end of said reaction mass;
    (c) a base plate connected to said piston rod;
    (d) a pair of substantially vertically disposed support columns comprising piston-cylinder assemblies adapted to support the weight of the transport vehicle thereon, one of said support columns being positioned to each side of said reaction mass;
    (e) a rigid plate positioned substantially horizontally below the reaction mass and adapted to permit passage of said piston rod therethrough, said rigid plate extending outwardly to each side of said reaction mass and the lower ends of said support columns being coupled to said rigid plate;
    (f) elastic means for supporting said rigid plate on said baseplate.

2. The apparatus of claim 1 wherein said elastic means comprises a plurality of air springs positioned between said rigid plate and said baseplate.

3. In a vibratory seismic energy source adapted to be transported on a vehicle comprising a reaction mass having a hydraulic power cylinder formed therein, a power piston reciprocably located within said power cylinder and a piston rod extending from the lower face of said power piston and connected at its lower end to a baseplate, a pair of substantially vertically disposed support columns comprising piston-cylinder assemblies adapted to support the weight of the transport vehicle thereon, one of said support columns being positioned to each side of said reaction mass, and said baseplate not extending laterally beneath said substantially vertically disposed support columns, the improvement comprising a rigid plate interposed between said reaction mass and said baseplate and adapted to permit motion of said piston rod in relation to said rigid plate, elastic means supporting said rigid plate from said baseplate in resilient, movable relation therewith, and means for attaching the lower ends of said support columns to said rigid plate to impose at least a portion of the weight of said vehicle on said rigid plate.

4. In a vibratory seismic energy adapted to be transported on a vehicle a reaction mass having a hydraulic power cylinder formed therein, a power piston reciprocably located within said power cylinder, a baseplate for coupling seismic energy to the ground, means for rigidly coupling said power piston to said baseplate, a pair of substantially vertically disposed support columns comprising piston-cylinder assemblies adapted to support the weight of the transport vehicle thereon, one of said support columns being positioned to each side of said reaction mass, and said baseplate not extending laterally beneath said substantially vertically disposed support columns, the improvement comprising a rigid plate interposed between said reaction mass and said baseplate and adapted to permit motion of said means for rigidly coupling said power piston to said baseplate in relation to said rigid plate, elastic means supporting said rigid plate from said baseplate in resilient, movable relation therewith, and means for attaching the lower ends of said support columns to said rigid plate to impose at least a portion of the weight of said vehicle on said rigid plate.

5. In a vibratory seismic energy source adapted to be transported on a vehicle, including a reaction mass having a vertically disposed power piston and cylinder assembly formed therein, a baseplate for coupling seismic energy to the ground, means for rigidly coupling the power piston to said baseplate, a pair of substantially vertically disposed support columns comprising piston-cylinder assemblies adapted to support the weight of the transport vehicle thereon, one of said support columns being positioned to each side of said reaction mass, the improvement which comprises a rigid plate interposed between said reaction mass and said baseplate and adapted to permit motion of said means for rigidly coupling said power piston to said baseplate in relation to said rigid plate, said rigid plate extending laterally outward to each side of said reaction mass to enable said support columns to be attached to said rigid plate, and elastic means for supporting said rigid plate from said baseplate in resilient, movable relation therewith.

6. The apparatus of claim 5 further including a plurality of connecting means affixed to said rigid plate for connecting lateral stabilizing means which extend between said rigid plate and said baseplate to said rigid plate, one of said connecting means being connected substantially in the front center of said rigid plate and one of said connecting means being connected substantially at the rear center of said rigid plate.

* * * * *